United States Patent
Irish et al.

(10) Patent No.: US 8,364,721 B2
(45) Date of Patent: Jan. 29, 2013

(54) SYSTEM AND METHOD FOR PROVIDING A GUIDED USER INTERFACE TO PROCESS WAYMARK RECORDS

(75) Inventors: Jeremy A. Irish, Seattle, WA (US); Sean E. Boots, Renton, WA (US); Elias C. Alvord, Seattle, WA (US)

(73) Assignee: Groundspeak, Inc., Seattle, WA (US)

( * ) Notice: Subject to any disclaimer, the term of this patent is extended or adjusted under 35 U.S.C. 154(b) by 659 days.

(21) Appl. No.: 12/483,197

(22) Filed: Jun. 11, 2009

(65) Prior Publication Data

US 2009/0313272 A1     Dec. 17, 2009

Related U.S. Application Data

(60) Provisional application No. 61/131,938, filed on Jun. 12, 2008.

(51) Int. Cl.
    *G06F 17/30*     (2006.01)
(52) U.S. Cl. ......... 707/803; 707/705; 707/724; 707/737
(58) Field of Classification Search .................. 707/705, 707/724, 737, 803
    See application file for complete search history.

(56) References Cited

U.S. PATENT DOCUMENTS

| | | | |
|---|---|---|---|
| 6,766,245 B2 | 7/2004 | Padmanabhan | |
| 6,889,247 B2 | 5/2005 | Christie et al. | |
| 6,985,905 B2 | 1/2006 | Prompt et al. | |
| 6,985,929 B1 | 1/2006 | Wilson et al. | |
| 7,068,309 B2 | 6/2006 | Toyama et al. | |
| 7,089,198 B2 | 8/2006 | Freedenberg et al. | |
| 7,095,871 B2 | 8/2006 | Jones et al. | |
| 7,107,285 B2 | 9/2006 | von Kaenel et al. | |
| 7,231,400 B2 | 6/2007 | Cameron et al. | |
| 7,236,173 B2 | 6/2007 | Chithambaram et al. | |
| 7,421,476 B2 | 9/2008 | Weaver | |
| 7,437,358 B2 | 10/2008 | Arrouye et al. | |
| 7,739,038 B2* | 6/2010 | Coch et al. | 701/468 |
| 7,873,697 B2* | 1/2011 | Goldstein et al. | 709/207 |
| 7,895,191 B2 | 2/2011 | Colossi et al. | |
| 2001/0034733 A1* | 10/2001 | Prompt et al. | 707/102 |
| 2002/0055924 A1* | 5/2002 | Liming | 707/100 |
| 2002/0087532 A1 | 7/2002 | Barritz et al. | |
| 2003/0189592 A1 | 10/2003 | Boresjo | |
| 2004/0066391 A1 | 4/2004 | Daily et al. | |
| 2004/0070678 A1* | 4/2004 | Toyama et al. | 348/231.3 |
| 2004/0220791 A1 | 11/2004 | Lamkin et al. | |
| 2005/0063083 A1 | 3/2005 | Dart et al. | |

(Continued)

OTHER PUBLICATIONS

Lim et al., "A Flexible Classification Scheme for Metadata Resources," Conference Proceedings, 2002, XP002392960, http://citeseer.ist.psu.edu/lim02flexible.html.

(Continued)

*Primary Examiner* — Thu-Nguyet Le
*Assistant Examiner* — Andalib Lodhi
(74) *Attorney, Agent, or Firm* — Patrick J. S. Inouye; Krista A. Wittman

(57) ABSTRACT

A system and method for providing a guided user interface to process waymark records is provided. Categories of published waymark records are maintained in a database. Each category is associated with at least one variable and one or more attributes, which each specify a type of metadata for the variables. The variables and attributes are presented for one of the categories in response to a request from a user. A user interface is applied to process input metadata for a physical object that is received from the user via the user interface. A consistency of the input metadata with the variables and attributes associated with the category is determined. The consistent input metadata is complied as a waymark record for the physical object. The waymark record is published and displayed on a map.

20 Claims, 23 Drawing Sheets

U.S. PATENT DOCUMENTS

| | | | |
|---|---|---|---|
| 2005/0132224 A1 | 6/2005 | Estrada et al. | |
| 2005/0156715 A1 | 7/2005 | Zou et al. | |
| 2005/0165861 A1 | 7/2005 | Christie et al. | |
| 2005/0203931 A1 | 9/2005 | Pingree et al. | |
| 2005/0228665 A1 | 10/2005 | Kobayashi et al. | |
| 2006/0041375 A1 | 2/2006 | Witmer et al. | |
| 2006/0167937 A1 | 7/2006 | Tierney | |
| 2006/0244830 A1* | 11/2006 | Davenport et al. | 348/148 |
| 2008/0080737 A1* | 4/2008 | Rhoads et al. | 382/100 |
| 2009/0026269 A1* | 1/2009 | Connell et al. | 235/462.41 |

OTHER PUBLICATIONS

Lim et al., "Supporting Field Study with Personalized Project Spaces in a Geographical Digital Library," Conference Proceedings of 7th International Conference of Asian Digital Libraries (ICADL2004), Nov. 2004, XP002392961, http://www.ntu.edu.sg/home/axsun/.

Candela et al., "The Personalized, Collaborative Digital Library Environment Cyclades and Its Collections Management," Conference Proceedings—SIGIR 2003, 2003, pp. 156-172, XP019002180.

Liu et al., "A Java-Based Digital Library Portal for Geography Education," Science of Computer Programming, 2004, XP002392962, http://citeseer.ist.psu.edu/liu04javabased.html.

Lim et al., "On Organizing and Accessing Geospatial and Georeferenced Web Resources Using the G-Portal System," Internet Publication, No. 5, Oct. 2004, XP004842400.

* cited by examiner

100 home > My Page > My Categories > Manage Lighthouses > Edit Lighthouse Variables you are logged in as bootron log out

GETTING STARTED
DIRECTORY
MY PAGE
FORUMS
RESOURCES
CONTACT US

CATEGORY MANAGEMENT
Things

Edit Lighthouse Variables

Variable Display Text:
Lighthouse Color
Variable Type:
Dropdown List

☐ Check here if variable answer is optional
☐ Archive Variable

Submit

You Are Here
Test Coordinate
change my location
map it
view Test Coordinate
coordinates Variable Options
• Add New Lighthouse Variable
• Edit Lighthouse Category
• Manage Lighthouses
• My Categories
• Transfer Lighthouse Ownership

— 102

— 103

Lighthouse Color Options:

| ID | Name | Display Order | | |
|----|------|---------------|------|---------|
| 14 | red | 1 | edit | archive |
| 15 | blue | 2 | edit | archive |
| 16 | yellow | 3 | edit | archive |
| 17 | green | 4 | edit | archive |

Add New Option:
Name: [        ]  Display Order: [  ]  [Add New Option]

Copyright © 2005 Groundspeak, Inc. | Click here to view our logo usage policy

101

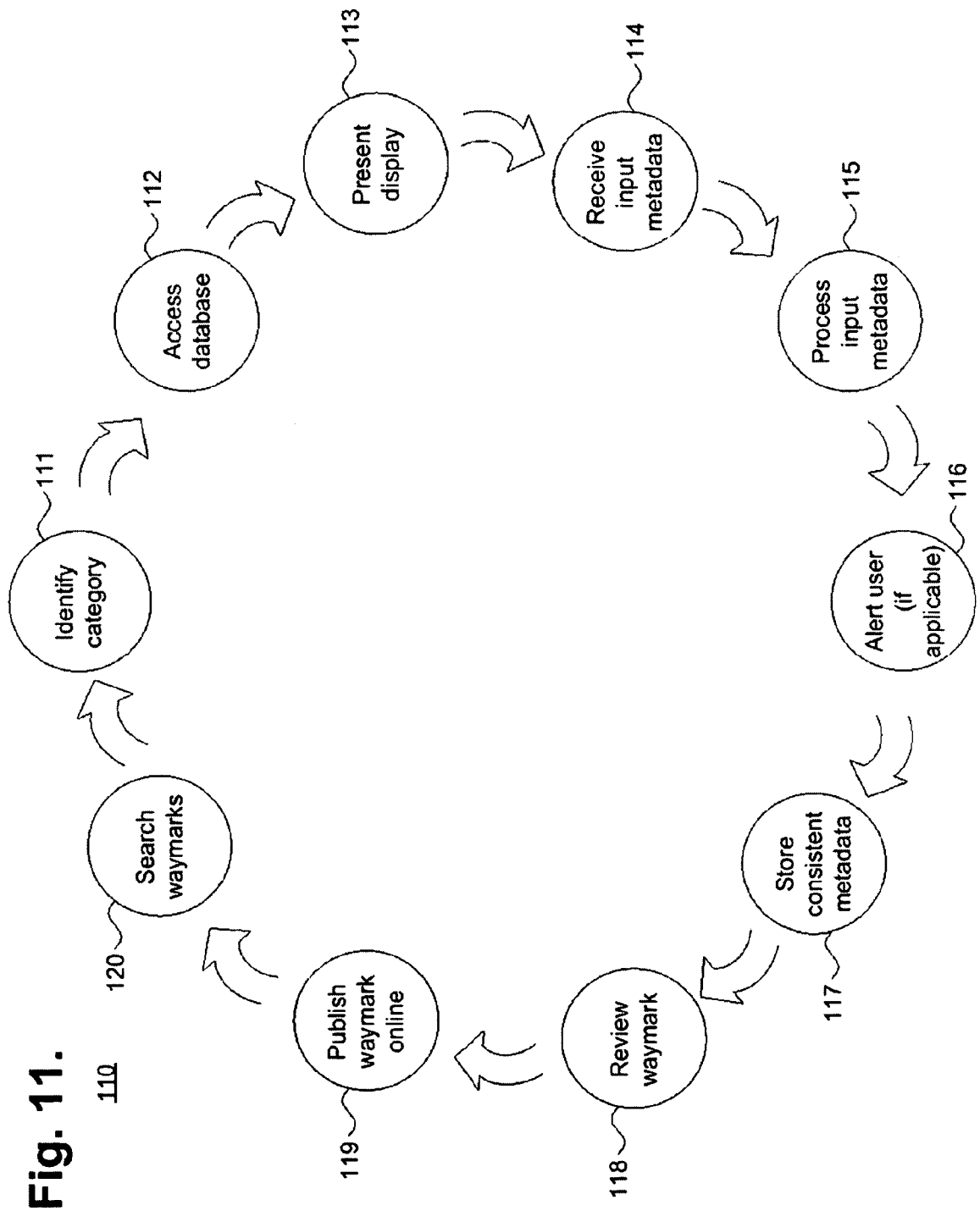

| home | my page | categories | groups | waymarks | news | forums |

Home > Categories > Category Keyword Search     you are logged in

Category Keyword Search Results

| waymark search | category search | group search | find a category (e.g. castles, firehouses, art museums, etc.):

[ (optional category or keyword) ] [ Search ]

132 — (left bracket to search box)    131 — (right bracket to Search button)

---

Categories: Keyword Search Results [show]

Total Records: 3 Page: 1 of 1     prev << <[1]> >> next

Coastal Lighthouses ★
by Historical Costal Lighthouse Group
Find a Lighthouse of Historical nature that was used to guide ships along the waterways of the world. Try to include the history of the light, including the lens used.

Landlocked Lighthouses ★
by Landlocked Lighthouse Lovers
It's normal to see a lighthouse along the seashore or overlooking a harbor. But sometimes we find them where there is no water! Record these out-of-place lighthouses here. Look below for detailed waymarking and visiting requirements.

Lighthouse Bed & Breakfasts ★
by Lighthouse Bed & Breakfast Group
Staying in a Lighthouse makes for a completely unique destination. This category is where you create waymarks for lighthouses that can accommodate the overnight guest. These B&B's can be actual lighthouses, replicant lighthouse, or keeper homes or even Light stations.

Total Records: 3 Page: 1 of 1     prev << <[1]> >> next 133 (bracket grouping the three categories above)
134 (label pointing to Lighthouse Bed & Breakfasts entry)

| home | my page | categories | groups | waymarks | news | forums |

Home > Categories > Category Keyword Search

Category Keyword Search Results you are logged in

141 — Filter: All waymarks [show]

Costal Lighthouses
Managed By: Historical Costal Lighthouse Group

142 — Description:
Find a Lighthouse of Historical nature that was used to guide ships along the waterways of the world. Try to include the history of the light, including the lens used.

143 — Waymarks [hide]
Currently displaying Costal Lighthouses

Total Records: 328  Page: 1 of 14    prev << <[1]> >> next

144 — Lighthouse "Lage Licht" in Rotterdam harbour, the Netherlands.
in Costal Lighthouses
Lighthouse "Lage Licht" in Rotterdam harbour, the Netherlands.

posted by: Barion
location: Netherlands    date listed: 10/1/2007
view gallery

145 — Category Options
Post New Waymark
View Category
View Gallery

Discuss this Category
Find Related Topics
Post New Forum Topic

Quick Searches

Waymark Searches:
My Waymarks
Featured Waymarks
Newest
My Unfinished
Waymarks I've visited

| home | my page | categories | groups | waymarks | news | forums |

Home > Categories > Category > Coastal Lighthouses    you are logged in

Add New Coastal Lighthouses Waymark

152 — [Enter Information]  [Upload Image(s)]  [Preview and Submit]

153 — Instructions for Posting a Costal Lighthouse Waymark:
Find a Lighthouse of Historical nature that was used to guide ships along the waterways of the world.

— 151

Name:
This is the name displayed for the waymark.
154 — [Alki Point Lighthouse]

Coordinates:
[Decimal Degrees (DegDec)]

155 { [N ▼] [47.576389]    [W ▼] [122.42055]

156 — Country     [United States ▼]
157 — State/Province [Washington ▼]

Short Description:    ☐ HTML Enabled?
[The Alki Point lighthouse is a 37 foot octagonal tower and was completed in 1913.]

158 {

Long Description:    ☐ HTML Enabled?
[Please write a detailed description of your waymark.]

Private Message:
Only you and the category Group officers will be able to see this message.    ☐ HTML Enabled?

[ ]

Costal Lighthouse:
An actual lighthouse used to warn mariners along the shore line
◉ Lighthouse
○ Light ship
○ none selected 159 — [Save and Continue →]

| home | my page | categories | groups | waymarks | news | forums |

Home > Categories > Category > Add New Waymark     you are logged in

Add New Coastal Lighthouses Waymark

| Enter Information | Upload Image(s) | Preview and Submit | ~161

162 — The following is a list of waymarks which have already been recorded within .5 miles of the coordinates you listed for your waymark. Please double-check to make sure you are not adding a waymark that already exists.

*TIP* If the waymark does already exist, you can still log it as a visit!

Existing Waymarks:

Waymarks [hide]

Total Records: 1 Page: 1 of 1     prev << <[1]> >> next

Log it!

163 —

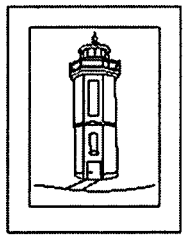

Alki Point Lighthouse
in <u>Coastal Lighthouses</u>

Alki Point Lighthouse marks the southern entrance to Elliott Bay.

posted by: <u>fishiam</u>
location: Washington
date listed: 8/17/2005     last visited: 8/11/2007

<u>view gallery</u>
⊗ 0 mi

164 — | Save Waymark Anyway |      | Return to Edit Page |

| home | my page | categories | groups | waymarks | news | forums |

Home > Categories > Category > Waymark you are logged in

"Happy Hollow Cemetery – Rock Township, WI" Waymark ~191

193 — view waymark gallery

Download this waymark:
LOC File
KML File (Google Earth)

Happy Hollow Cemetery—Rock Township, WI in Abandoned Cemeteries

Posted by: steveherrick

N 42° 36.154 W 089° 01.544
16T E 333822 N 4718671

Quick Description: This cemetery, also called Gower Cemetery, is not being maintained.

Location: Wisconsin, United States
Date Posted: 10/9/2007 12:47:27 PM
Waymark Code: WM2BZH
Reviewed by: Raine        Views: 12

194

Waymark Options ~197
Visit Waymark (Post Log) ~192
View Visits (1) ~198
View Waymark ~199
View Gallery (7) ~200

Discuss the Waymark ~201
Find Related Topics
Post New Forum Topic

Quick Searches ~202
Waymark Searches:
My Waymarks
Featured Waymarks
Newest
My Unfinished
Waymarks I've visited 195 — Long Description:
I found one legible grave and did a rubbing on another one.

196 — Visit Instructions:
Take a photo of at least one grave marker and including a qualitative and quantitative description

Search for...
Geocaching.com Maps
Geocaching.com Google Maps

Recent Visits/Logs:
Date Logged    Log
10/6/2007      steviet visited it

Visit all visits/logs

Fig. 19.

210 home > My Page > My Logs you are logged in as bootron log out

MY LOGS

You Are Here

Test Coordinate
change my location
map it!
view Test Coordinate
coordinates

My Page Options
- My Account
- My Categories
- My Coordinates
- My Waymarks

GETTING STARTED
DIRECTORY
MY PAGE
FORUMS
RESOURCES
CONTACT US

Total Records: 14 -- Page: 1 of 1   Prev. << < [1] > >> Next

| Log | Rating | Date Logged | | |
|---|---|---|---|---|
| ☺ bootron visited Lighthouse Test | | 5/17/2005 | [edit] | [view] |
| ☹ bootron couldn't find K 384 | | 5/16/2005 | [edit] | [view] |
| ☺ bootron visited NewTest | | 5/13/2005 | [edit] | [view] |
| ☺ bootron visited K 384 | ★★☆☆☆ | 5/12/2005 | [edit] | [view] |
| ☺ bootron visited KING COUNTY AIRPORT BEACON | ★★★★★ | 5/11/2005 | [edit] | [view] |
| ☺ bootron visited L 264 | ★★★★★ | 5/11/2005 | [edit] | [view] |
| ☹ bootron couldn't find L 264 | | 5/11/2005 | [edit] | [view] |
| ☺ bootron visited HAFF | ★★★☆☆ | 5/17/2005 | [edit] | [view] |
| ☺ bootron visited SWINOMISH CHAN E POWER POLE | ★★★☆☆ | 11/30/2003 | [edit] | [view] |
| ☹ bootron couldn't find Q 462 | ★★★☆☆ | 4/13/2003 | [edit] | [view] |
| ☺ bootron visited Q 462 | | 9/14/2002 | [edit] | [view] |
| ☺ bootron visited RENTON DIST 90 STANDPIPE NO 3 | ★★☆☆☆ | 9/6/2002 | [edit] | [view] |

Total Records: 14 -- Page: 1 of 1   Prev. << < [1] > >> Next

211

212

Copyright © 2005 Groundspeak, Inc. | Click here to view our logo usage policy

| home | my page | categories | groups | waymarks | news | forums |

Home > Categories > Category > Waymark    you are logged in

Edit Waymark    ~231

Instructions for Posting a Abandoned Cemeteries Waymark:

232 — DO:
- Record the earliest date of burial
- Record the latest date of burial
- Record any of the surnames of the people buried
- Take one or more photographs of the area
- Attempt research on the cemetery and its departed guests DO NOT:
- Record cemeteries in use today
- Record cemeteries which are still maintained on a regular basis Name:
This is the name displayed for the waymark.
[Happy Hollow Cemetery—Rock Township, WI]

233 —

Coordinates:
[Decimal Degrees (MinDec) ▼]

[N ▼] [47.576389]    [W ▼] [122.42055]

Country       [United States ▼]
State/Province [Washington ▼]

Short Description:
This cemetery, also called Gower Cemetery and the Rock Township Cemetery is not being maintained.

Long Description:
<P>I found one legible grave and did a rubbing on another one. </P>

Private Message:
Only you an the category Group Officers will be able to see this message.

234 — [ Update Waymark ]

Fig. 25.

220 home > Waymark Directory > Search Results you are logged in as bootron log out

SEARCH RESULTS

GETTING STARTED
DIRECTORY
MY PAGE
FORUMS
RESOURCES
CONTACT US

GET THE BOOK
GEAR click here
CACHE IN TRASH OUT

Things

Waymark Directory (no filter)

⇈ Directory Home > Things > Lighthouses (5)

Total Records: 5 – Page: 1 of 1       Prev. << < [1] > >> Next

↧ S 17.1 mi
Test House
By bootron
This is only a test
Date Created: 5/12/2005 | Date Last Visited: 5/12/2005
Lighthouses
Washington ↧ S 17.1 mi
New Test
By bootron
asdasdasdasda
Date Created: 5/13/2005 | Date Last Visited: 5/13/2005
Lighthouses
Washington ↧ S 18.1 mi
Lighthouse Test
By bootron
djakasjj asdjkda djkdasd jaksdl
Date Created: 5/17/2005 | Date Last Visited: 5/17/2005
Lighthouses
Washington ↧ N 39.7 mi
Cow Mailbox
By bootron
short description
Date Created: 5/17/2005 | Date Last Visited: 5/17/2005
Funny Mailboxes
Washington ↧ NW 56 mi
Alki Point Lighthouse
By bootron
Point Wilson marks the west entrance into the Puget Sound. It is the turning point from the Strait of Juan de Fuca into Admiralty Inlet.
Date Created: 5/13/2005 | Date Last Visited: 5/13/2005
Lighthouses
Washington

271

You Are Here
Test Coordinate
change my location
map it!
view Test Coordinate coordinates

Waymark Search
Search for Lighthouse Waymarks
Present Search Type:
By Postal Code: 98058
Present Search Location:
N 47° 26.742
W 122° 8.448
10T E 564775 N 5255052
new search by postal code: [    ] [go!]
new search by my coordinates [go!]
(select one) ▾
new search by state:
(select state) ▾ [go!]
new search by country:
(select country) ▾ [go!]

Category Options
• Record New Lighthouses
• Add New Lighthouse Subcategory
• Edit Lighthouse Category

| home | my page | categories | groups | waymarks | news | forums |

Home > Categories > Category > Waymark you are logged in

"Cow Mailbox – Seattle, WA" Waymark

281 view waymark gallery

Download this waymark:
LOC File
KML File (Google Earth)

282 — Cow Mailbox—Seattle, WA in Funny Mailboxes

Posted by: Mr. Moo

283 — N 42° 36.154 W 089° 01.544
16T E 333822 N 4718671

Quick Description: Utterly amazing mailbox

Location: Washington, United States
Date Posted: 10/9/2007 12:47:27 PM
Waymark Code: WM2BZH
Reviewed by: Raine      Views: 12

Long Description:
I found one legible grave and did a rubbing on another one.

Visit Instructions:
Take a photo of at least one grave marker and including a qualitative and quantitative description

Search for...
Geocaching.com Maps
Geocaching.com Google Maps

Recent Visits/Logs:
Date Logged   Log
10/6/2007   John I visited it

Visit all visits/logs

284

Waymark Options
Visit Waymark (Post Log)
View Visits (1)
View Waymark
View Gallery (7)

Discuss the Waymark
Find Related Topics
Post New Forum Topic

Quick Searches

Waymark Searches:
My Waymarks
Featured Waymarks
Newest
My Unfinished
Waymarks I've visited

SYSTEM AND METHOD FOR PROVIDING A GUIDED USER INTERFACE TO PROCESS WAYMARK RECORDS

CROSS-REFERENCE TO RELATED APPLICATION

This non-provisional patent application claims priority under 35 U.S.C. §119(e) to U.S. Provisional Patent application, Ser. No. 61/131,938, filed Jun. 12, 2008, the disclosure of which is incorporated by reference.

FIELD

The invention relates in general to online waymark collaboration and, specifically, to a system and method for providing a guided user interface to process waymark records.

BACKGROUND

Global Positioning System (GPS) receivers have become increasingly popular as personal navigational aids and as features integrated into consumer electronics, such as cellular telephones, wireless personal data assistants, and automobile navigation systems. GPS receivers are passive devices that provide geolocational data only, which must be combined with maps, charts, and other navigational aids to bring meaning to raw latitude and longitude coordinates. Integrating GPS receivers into consumer electronics or navigation systems has enabled users to retrieve helpful travel-related information and, in some configurations, to store additional information. However, such information generally remains personal to the user, unless shared or posted through some form of digital data communications, such as e-mail, text messaging, or Web sites.

Recently, Web logs or "blogs," have begun to proliferate as a new form of Web-based digital data communication. Blogs are online forums for the sharing of the personal thoughts of the author, known as a "blogger," as well as other types of digital information, such as images, sounds, video clips, and files. Blogs are journals or diaries generally publicly accessible that are often updated on a frequent basis, or whenever the blogger chooses. Blog readers are invited to post their comments and submit their own information for other readers to consider.

Blogs are a form of interactive Web site with content written and published or provided by the individual blogger. Often, blogs are in the style of an unstructured narrative that might be organized by date or topic, yet can often cover rambling and wide-ranging topics, as reflected by the blogger's personal tastes. Still, blog information can be useful, such as where a blogger chronicles travels in a region of particular interest. Regular readers may be able to follow the bloggers travels, but other readers must use search engines or features to mine travel information from the blog. Found information, though, may not be of the type or caliber sought, making the search effort of little help.

While travel-themed blogs sometimes offer valuable insights, online travel information databases are usually more informative and in a better structured and consistent form. These databases are generally well-indexed and searchable, but esoteric and niche information can be rare. To meet the needs of a broader audience, the sharing of personalized travel information is either unsupported or discouraged. Furthermore, locations of arcane or limited interest, such as Elvis tribute museums, may be unavailable, as these types of locations seldom attract enough interest to warrant space, except for a few aficionados.

Moreover, online travel information databases, when organized by geolocational data, such as available via GPS, are generally structured to provide an identity to a set of raw geolocational coordinates. Restaurants, for instance, are stored in the database by geolocation, and are not usually indexed by personal taste, niche appeal, or similar criteria. As well, the geolocational data is frequently indexed under predefined categories or key words without provision for adding new information, personalization, or collaborative sharing via a blog.

Geolocational data may also be viewed directly online using Web-based two-dimensional maps and three-dimensional Earth browsers, also known as "geobrowsers," such as Google Earth, licensed by Google Inc., Mountain View, Calif. Geospatial language scripts, such as the Keyhold Markup Language, allow Web pages to include geographic annotations and visualizations for locations that are specified through geolocational data. However, the geobrowsers only display maps and visualizations and any personalizations manually added by a user without provisions for interactive sharing of personalized travel information.

SUMMARY

A system and method includes a centralized database for storing waymark records. Each waymark record provides an unstructured cache of information that associates geolocational data with metadata. The waymark records are organized into a schema of directories, categories, and subcategories that can be navigated by, for instance, topic, and which can be searched, for example, by content or geolocational data. Variables and attributes can be individually specified for each category or subcategory to organize the types of metadata associated with particular waymark records. Permissions control the addition, editing, and deletion of waymarking data from the database. Waymark records can be posted into the categories and subcategories and a set of log entries allow user commentary and exchange regarding posted waymark records. In a further embodiment, the waymarking data can be exported as a portable schema that enables other applications to read, display, and download the waymarking data.

Creators and owners can create, manage, and control the categories and subcategories by defining category rules, variables, and attributes. Once created, the category or subcategory is published. Users can post a waymark record using a guided user interface for providing metadata requested by the creator or owner of the category. The creators and owners can review and edit the waymark record prior to display with the category.

One embodiment provides a system and method for providing a guided user interface to process waymark records. Categories of published waymark records are maintained in a database. Each category is associated with at least one variable and one or more attributes, which each specify a type of metadata for the variables. The variables and attributes are presented for one of the categories in response to a request from a user. A user interface is applied to process input metadata for a physical object that is received from the user via the user interface. A consistency of the input metadata with the variables and attributes associated with the category is determined. The consistent input metadata is complied as a waymark record for the physical object. The waymark record is published and displayed on a map.

A further embodiment provides a system and method for managing a category. Waymark records are each associated with a category and maintained on a database. Each waymark record includes metadata associated with at least one variable and one or more attributes specifying a type of the metadata for each variable. Access to the database is provided. A user having access to the database is identified based on a list of authorized users. A request from the user to present one such category and the associated waymark records is received. At least one waymark record from the requested category is processed. Input metadata is received from the user consistent with the variables and the attributes for that waymark record. At least a portion of the metadata is replaced with the input metadata. The processed waymark record is displayed on a map.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 8 is a screen shot showing, by way of example, a Web page for editing a category of waymark records.

FIG. 9 is a screen shot showing, by way of example, a Web page for viewing category variables.

FIG. 10 is a screen shot showing, by way of example, a Web page for editing category variables.

FIG. 11 is a process flow diagram showing a process for posting waymark records to a category.

FIG. 12 is a screen shot showing, by way of example, a Web page for ad hoc searching of categories.

FIG. 13 is a screen shot showing, by way of example, a Web page for submitting a request to post a new waymark record.

FIG. 14 is a screen shot showing, by way of example, a Web page for entering metadata for a new waymark record.

FIG. 15 is a screen shot showing, by way of example, a Web page for providing a notification to a user.

FIG. 18 is a screen shot showing, by way of example, a Web page for a waymark record with a post log button.

FIG. 19 is a screen shot showing, by way of example, a Web page for a set of log entries regarding waymark records.

FIG. 21 is a screen shot showing, by way of example, a Web page for editing a waymark record.

FIG. 25 is a screen shot showing, by way of example, a Web page for viewing search results.

FIG. 26 is a screen shot showing, by way of example, a Web page for downloading a waymark record.

DETAILED DESCRIPTION

Geolocational Data and Metadata Collection

Figure 1:
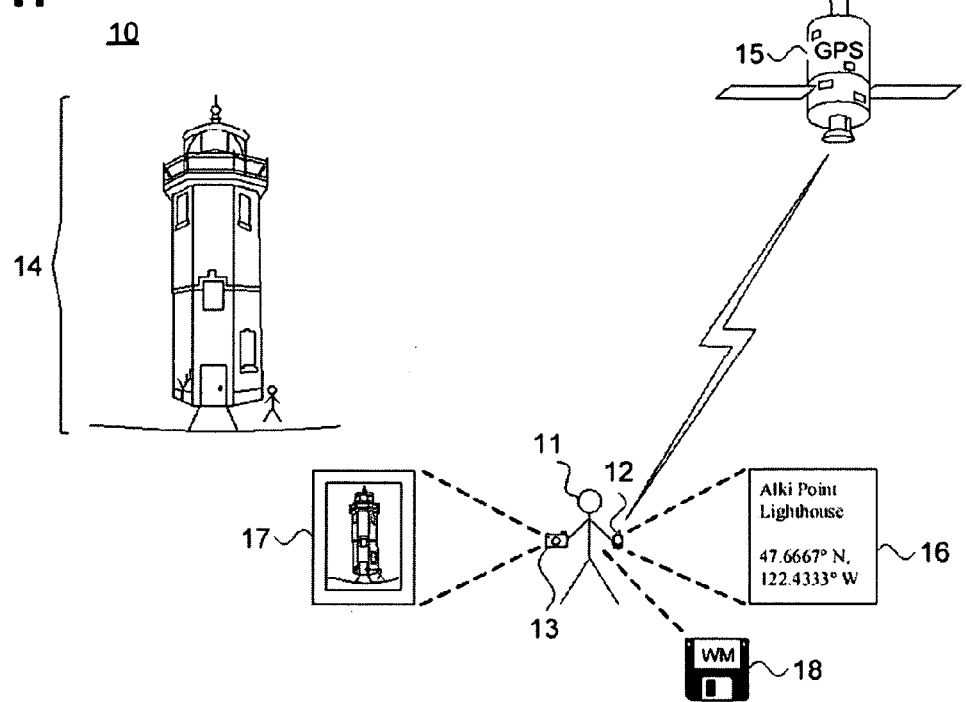
FIG. 1 is a block diagram showing, by way of example, collection of geolocational data and metadata at a waymark record.

Metadata is data about data. A waymark identifies people, places, and things with geolocational data. Metadata about a waymark contains the actual data about the people, places, and things. In database terms, waymark records associate the metadata about the people, places, and things with geolocational data in a structured database format, although other types of geolocational data associations are also possible. FIG. 1 is a block diagram showing, by way of example, collection 10 of geolocational data 16 and metadata 17 at a waymark location 14. An individual 11, such as a traveler or local resident, decides to create a waymark record 18 for a particular location 14. A waymark record 18 is an unstructured cache of information suitable for storage in a database and which includes metadata and geolocational data, such as GPS coordinates. The metadata includes digitally-storable information that can be used to describe or be associated with some physical object, such as narrative text containing comments, ratings, physical characteristics, construction, color, dimensions, and so forth, images, sound, video, and other forms of data or any combinations thereof. The metadata can also include a downloadable or readable file that contains, for instance, geospatial language scripts for use with Web-based two-dimensional maps and three-dimensional geobrowsers. Other types of metadata are possible. In addition, the physical object described or associated using a waymark record 18 can be a place, such as location 14, or any other kind of physical object, including people, and things, that can be associated with geolocational data. The physical object need not be stationary nor earthbound. A physical object could be moving or temporarily be still, and could be found on the land, water, air, under ground, above ground, or in space. Other physical objects and spatial orientations are possible.

Conveniently, the individual 11 is carrying a GPS receiver 12 and a digital camera 13. The individual 11 uses the GPS receiver 12 to receive geolocational data 16 from a GPS system 15, which can include conventional out-of-doors GPS signals, as well as repeated GPS signals configured to be received indoors or from stationary beacons providing GPS-like signals from a stationary permanent position. Other types of geolocational data sources are possible, such as a locational relay or beacon via a wireless network connection, for instance, WiFi. The geolocational data 16 includes, for instance, latitude, longitude, altitude, and precision, which can be used to identify the global location of location 14. The geolocational data 16 can also include a collection of points defining a polygon, tracked lines, and three-dimensional shapes, such as altitude and a collection of points surrounding a contained or enclosed space. Other types of geolocational data are possible. The GPS receiver 12 could be a standalone device or integrated into a consumer electronics device, such as a cellular telephone, wireless personal data assistant, automobile navigation system, or other GPS-enabled device.

The individual 11 also uses the digital camera 13 to take a digital picture of the physical object, such as a lighthouse, appearing at the location 14. The digital picture can be associated with the geolocational data 16 as metadata 17. Other types of devices either in lieu of or in addition to a digital camera 17, such as a personal data assistant or notebook computer, audio or video recorder, film camera, or any other type of device capable of fixing an expression describing or regarding the physical object in a tangible medium are possible. The geolocational data 16 and metadata 17 together form the waymark record 18, which can be compiled into a sharable online database of geolocational data with an exportable schema, as further described below beginning with reference to FIG. 3. In a further embodiment, the geolocational data 16 can be included in a file, such as encoded using geospatial language scripts to enable the location 14 to be mapped or visualized by a geobrowser, as further described below with reference to FIG. 26.

Zones of Influence

Figure 2:
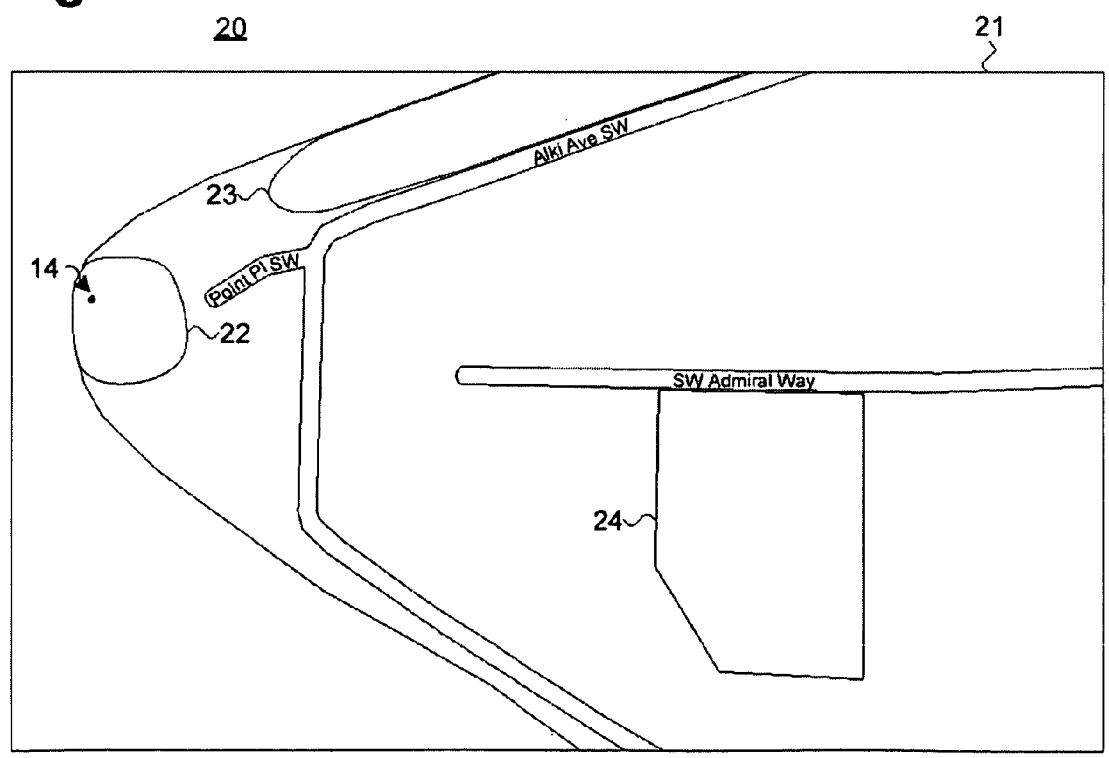
FIG. 2 is a map diagram showing, by way of example, zones of influence overlaid on the waymark record of FIG. 1.

In a further embodiment, the location 14 of a physical object described by a waymark record 18 can be placed within a zone of influence. FIG. 2 is a map diagram 20 showing, by way of example, zones of influence 22, 23, 24 overlaid on the waymark location 14 of FIG. 1. A zone of influence is stored geolocational data that forms or defines a logically-enclosed physical space. The space is created by logically connecting each discrete point of geolocational data to another discrete point. The lines connecting the discrete points thus "enclose" the physical space. Zones of influence can be defined in mutually exclusive, overlapping, and encapsulating or nested arrangements of various shapes and sizes, both immediately about or proximal to a particular waymark location 14. In addition, computer-executable events can be logically linked to one or more of the zones of influence and can be triggered based on locational, temporal, and independent conditions, such as described in commonly-assigned U.S. Pat. No. 6,691, 032 to Irish et al. on Feb. 10, 2004, the disclosure of which is incorporated by reference. Locational conditions include physical movement of a user as determined using a GPS-type device. Temporal conditions include the passage of time or expiry of a time limit. Independent conditions include occurrences whose cause is untied to the zone of influence.

As an example, the neighborhood areas 21 proximal to the waymark location 14 can be surveyed to identify those physical areas around which zones of influence could be defined to supplement the waymark record 18. For instance, the immediate area surrounding the waymark location 14, such as a public park surrounding a lighthouse, could be logically defined as a first zone of influence 22. Similarly, a nearby waterfront beach area could be logically defined as another zone of influence 23. Finally, a public playground that includes baseball diamonds could be logically enclosed in a further zone of influence 24.

Online Geolocational Data Compilation and Collaboration Environment

Figure 3:
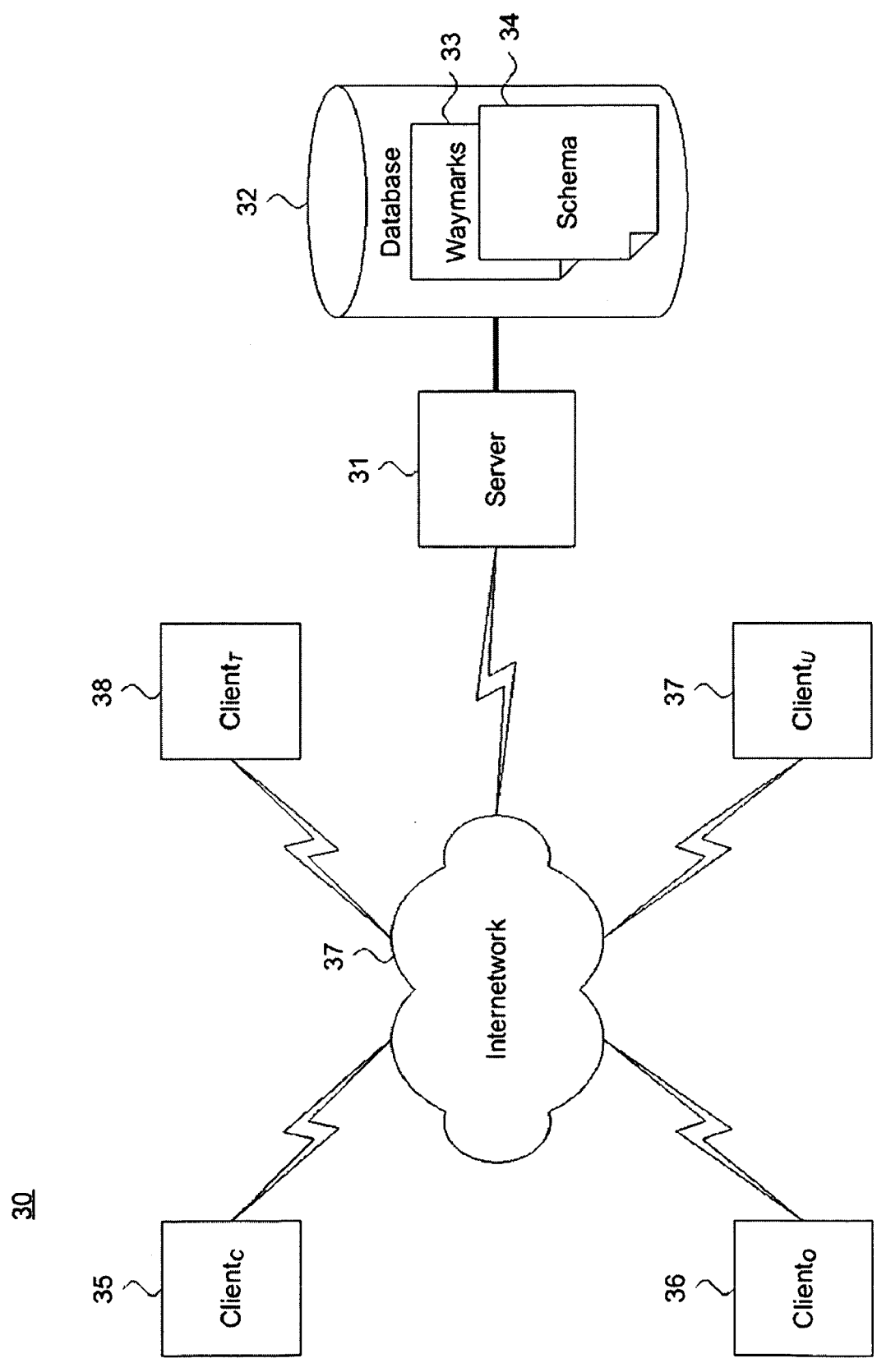
FIG. 3 is a functional block diagram showing an online geolocational data compilation and collaboration environment, in accordance with one embodiment.

Waymark records associate geolocational data 16 and metadata 17 through a database, which can be shared by an online community of users. FIG. 3 is a functional block diagram showing an online geolocational data compilation and collaboration environment 30, in accordance with one embodiment. Shared waymark records 33 are centrally stored in a database 32 with an exportable schema 34 managed by a server 31. In addition, the server 31 allows users to log their personal interactions with the physical objects described by or associated with waymark records 33 and publishes the waymark records 33 for online collaboration, as further described below with reference to FIG. 15, and, in a further embodiment, to annotate files containing executable geospatial language scripts, as further described below with reference to FIG. 26.

Online users can access the server 31 over an internetwork 37, such as the Internet, to compile new waymark records 33 into the database 32 and to collaborate and share their personal experiences. To facilitate user navigation and searching, the waymark records 33 and the metadata 17 are organized into data and metadata hierarchies, as further described below respectively with reference to FIGS. 4 and 5. The structuring of the database 32 and the waymark records 33 stored in the database 32 together form waymarking data.

Figure 6:
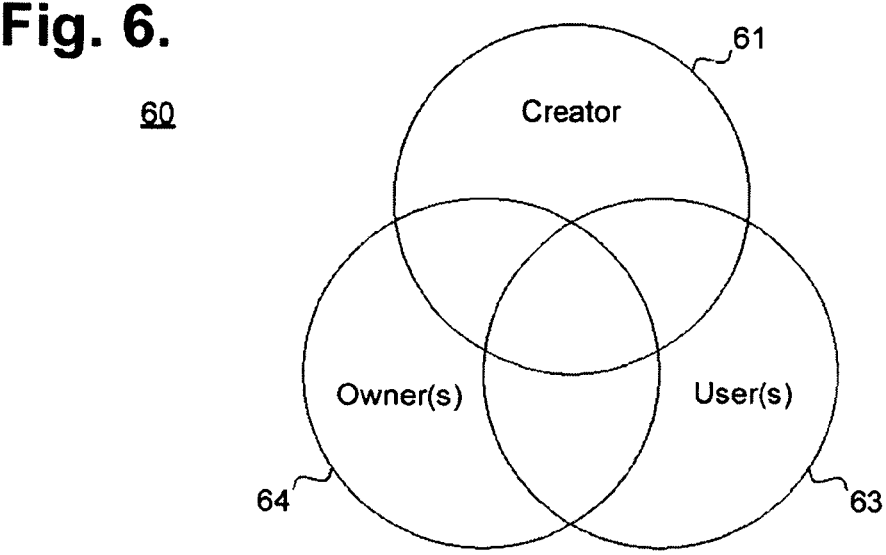
FIG. 6 is a Venn diagram showing ownership and control over the database of FIG. 3.

In addition, the server 31 provides ownership controls over the database 32 for each creator client 35, Client$_C$; owner client 36, Client$_O$; and user client 37, Client$_U$; as further described below with reference to FIG. 6. The clients 35, 36, 37 form the user community having direct management over and access to the waymark records 33. The clients 35, 36, 37 are not necessarily separate computer systems, but are logically identified as separate ownership entities that affect the types of operations that can be performed on the database 32. Other types of ownership entities are possible.

Finally, the server 31 can export a schema 34 to describe and validate the waymark records 33 and to enable other applications, such as an application executing on a third party client 38, Client$_T$, to access and download the waymarking data. In providing the schema 34, the server 31 functions as a logical "toolbox" that facilitates distributed online sharing of ad hoc geolocational data. Waymark record schemas can be dynamically created by users through the server 31 based on the variables and attributes for a particular waymark record category or subcategory. For example, a schema for a lighthouses category could contain "DateBuilt" and "Color" variables, whereas a schema for a factory tours category could contain "Produces" and "HoursOfOperation" variables. Other waymark record schemas are possible. In an embodiment, schemas can only be built and maintained if a category matching the waymark record exists.

Data Hierarchy

Figure 4:
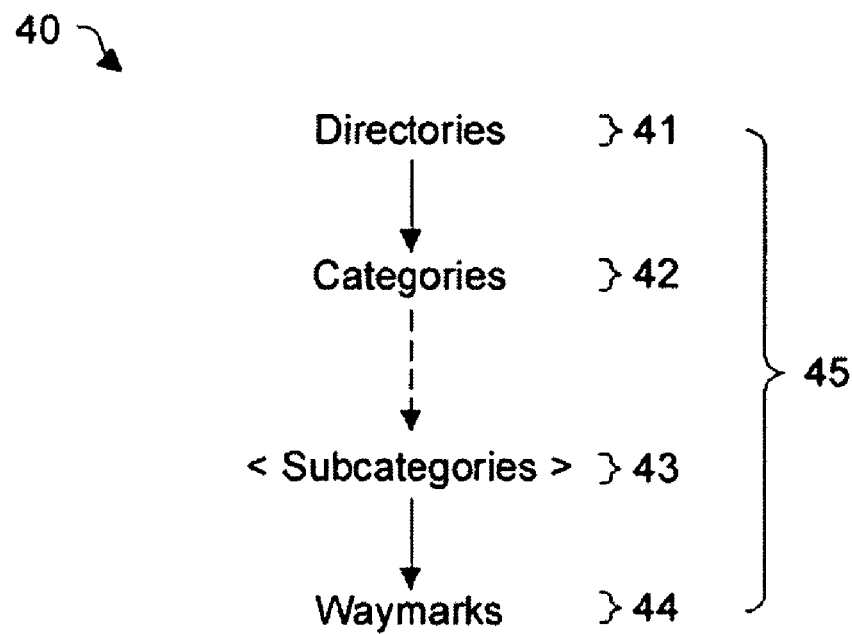
FIG. 4 is a data diagram showing a data hierarchy for use in the environment of FIG. 3.

The structure for storing the waymark records 33 is organized into a hierarchy that forms an exportable schema. FIG. 4 is a data diagram showing a data hierarchy 40 for use in the environment 30 of FIG. 3. When posted into the database 32, the data hierarchy 40 facilitates efficient user navigation and searching and provides control over ownership permissions.

In one embodiment, a set of top level directories 41 are used to root separate data hierarchies 40 for topical groupings of waymark records. For example, the directories 41 could include people, places, and things. Other directories are possible. Within each directory 41, one or more categories 42 and, optionally, one or more successive layers of subcategories 43 can be added to narrow down the specific topical grouping of the waymark records. For example, a places directory could have categories and subcategories for countries, states or provinces, cities, and neighborhoods. Other categories and subcategories are possible. Additionally, further levels of the hierarchy are possible.

The waymark records 44 are stored under appropriate categories 42 or, if provided, subcategories 43, to form the leaves of the data hierarchy 40. Other types of organizations for storing the waymark records in addition to or in lieu of a hierarchy, including linked lists and relational structures, are possible.

Finally, the data hierarchy forms an exportable schema 45, which can be exported as a portable data definition schema implemented, for example, as an XML Schema Definition (XSD). The schema 45 describes and validates the waymarking data for portable use in a multi-platform environment. Using the schema 45, third party applications can read and download the waymark records 44 in a structured format in which the waymark records 44 are exposed and accessible. Third party applications include browsers on Web-enabled devices, stand alone applications, and custom applications executing in an embedded environment as part of, for instance, a GPS receiver. Other schema definitions and structured formats either in addition to or in lieu of XSD and XML are possible, including derivations of XML, such as the Keyhole Markup Language (KML), which is used to define geolocational data files executable by geobrowsers and the like.

Metadata Hierarchy

Figure 5:
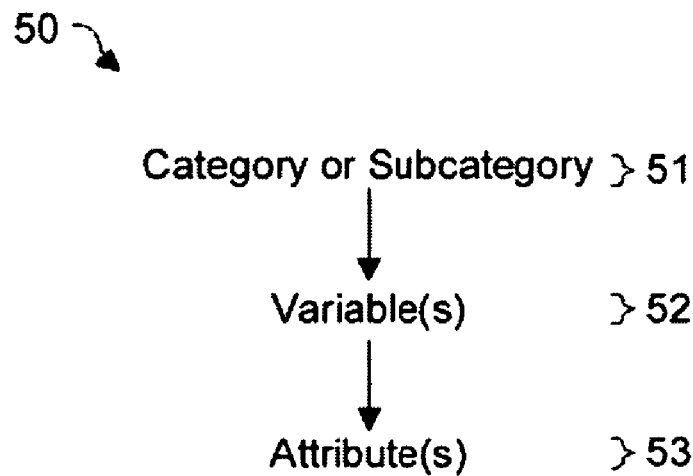
FIG. 5 is a data diagram showing a metadata hierarchy for use in the environment of FIG. 3.

The structure for storing the metadata 17 assigned to each particular form of waymark record 44 is also organized into a hierarchy. FIG. 5 is a data diagram showing a metadata hierarchy 50 for use in the environment 30 of FIG. 3. Metadata 17 is unstructured and can be uniquely defined for each particular category or subcategory 51. One or more variables 52 can be associated with each particular category or subcategory 51 and each variable 52 is assigned one or more attributes 53 that describe the type of data storable under the variable 52. For example, a variable for color could have attributes specifying color choices, such as red, green, and blue. Nested variables are possible. In addition, the variables 52 can be inherited by child objects from parent categories or subcategories 51. In a further embodiment, the metadata hierarchy can be included in the schema 45, described above with reference to FIG. 4, for the waymarking data. Other types of organizations for storing the metadata in addition to or in lieu of a hierarchy are possible.

Geolocational Data Ownership and Control

The ownership of categories 42, subcategories 43, and variables 52 can be controlled by the server 31. FIG. 6 is a Venn diagram 60 showing ownership and control over the database 32 of FIG. 3. Categories 42, subcategories 43, and variables 52 can only be created by a single creator 61, which can be a logical group of one or more people. However, the ownership over the category or subcategory, which includes the ability to modify or remove schema properties, can be transferred to another single creator 61 to ensure, for instance, that the characteristics of each category or subcategory remain well-structured and suitable for collaborative use. Individual owners 62 can create, change, and remove specific instances of waymark records 44, but, unless also a creator 61, cannot alter the underlying schema employed for the corresponding category or subcategory. In addition, the roles of creator 61, owner 62, and user 63 can be mutually exclusive or overlapping. For example, a user 63 could simultaneously be the creator 61 and owner 62 for the same object. Other types of ownership and control schemes are possible.

Process for Online Collaboration

Figure 7:
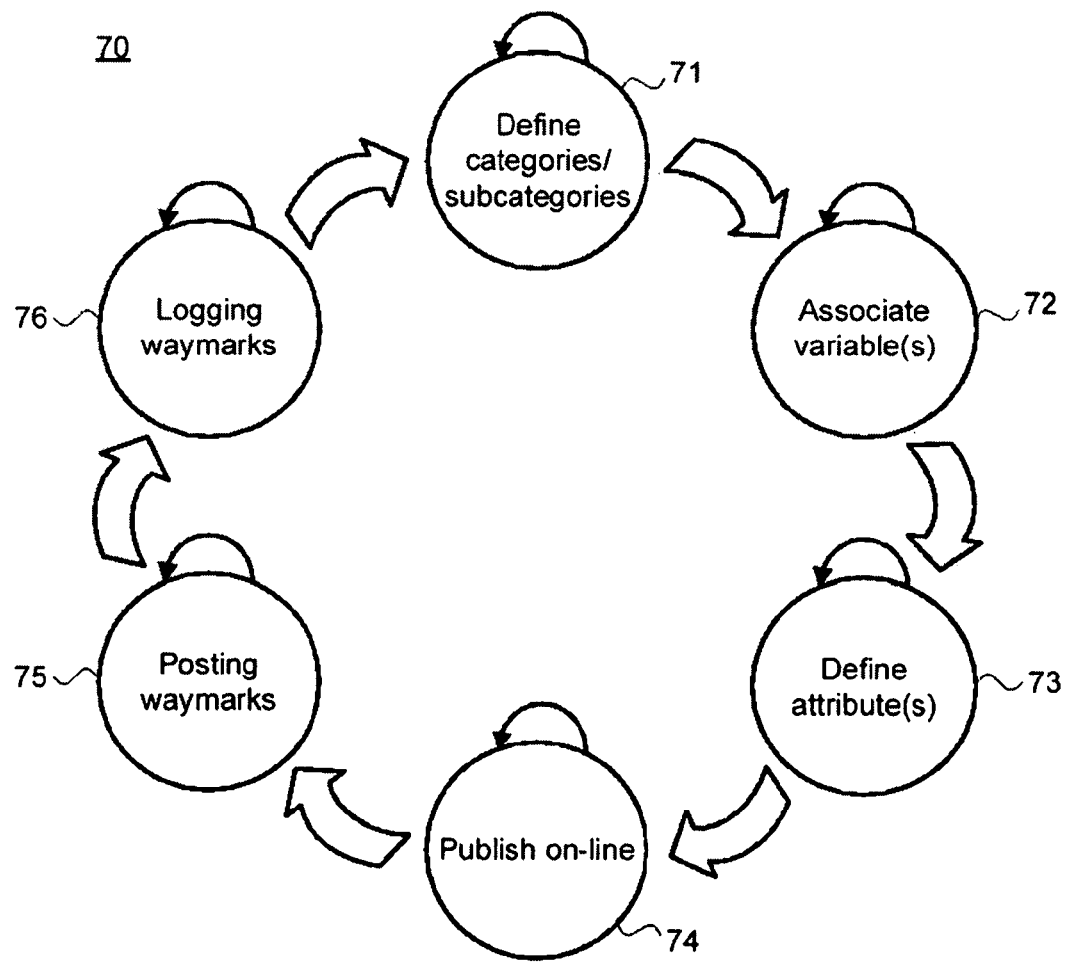
FIG. 7 is a process flow diagram showing waymark record category creation and ad hoc compilation of geolocational data for online collaboration in the environment of FIG. 3.

Online collaboration of waymark records 44 occurs as an on-going and continuously evolving process that invites online user participation, collaboration, and sharing. FIG. 7 is a process flow diagram showing waymark record category creation and ad hoc compilation 70 of geolocational data 33 for online collaboration in the environment 30 of FIG. 3. In one embodiment, the use of a hierarchy to structure the organization of waymark records 44 and metadata 17 implies a specific ordering of operations to facilitate waymark record sharing. Other operation orderings are possible.

During waymark record category creation, categories 42 and subcategories 43 are first defined (operation 71) to set up the basic structuring for waymark record storage under the directories 41. One or more variables 52 can be associated with specific categories 42 or subcategories 43 (operation 72). Similarly, attributes 53 are defined for each of the variables 52 (operation 73). As the metadata 17 is unstructured, the variables 52 and attributes 53 are defined to channel the kinds of information submitted into ad hoc classes of information. Finally, the waymark record categories 42 and subcategories 43 are published online (operation 74), which allow the user community access to post new waymark records 44 in those categories and subcategories. In one embodiment, the waymark records are published through a Web-based user interface, as further described below beginning with reference to FIG. 8.

During ad hoc compilation, the user community can post waymark records 33 (operation 75) and create log entries concerning the waymark records (operation 76), as further described below respectively with reference to FIGS. 13 and 14. Waymark records 33 are posted by navigating or searching through the categories and subcategories and entering or editing geolocational data 16 and metadata 17 for the selected waymark record 33. Log entries are similarly created navigating or searching through the categories and subcategories to a particular waymark record 33 and entering or editing a log entry, which can include narrative text, a rating, further metadata, and other information, including geospatial language scripts encoding metadata and geolocational data. Other types of process flows are possible, as would be implied in part by the form of data organization implemented for the waymark records 44 and metadata 17.

Category Management

Figure 8:
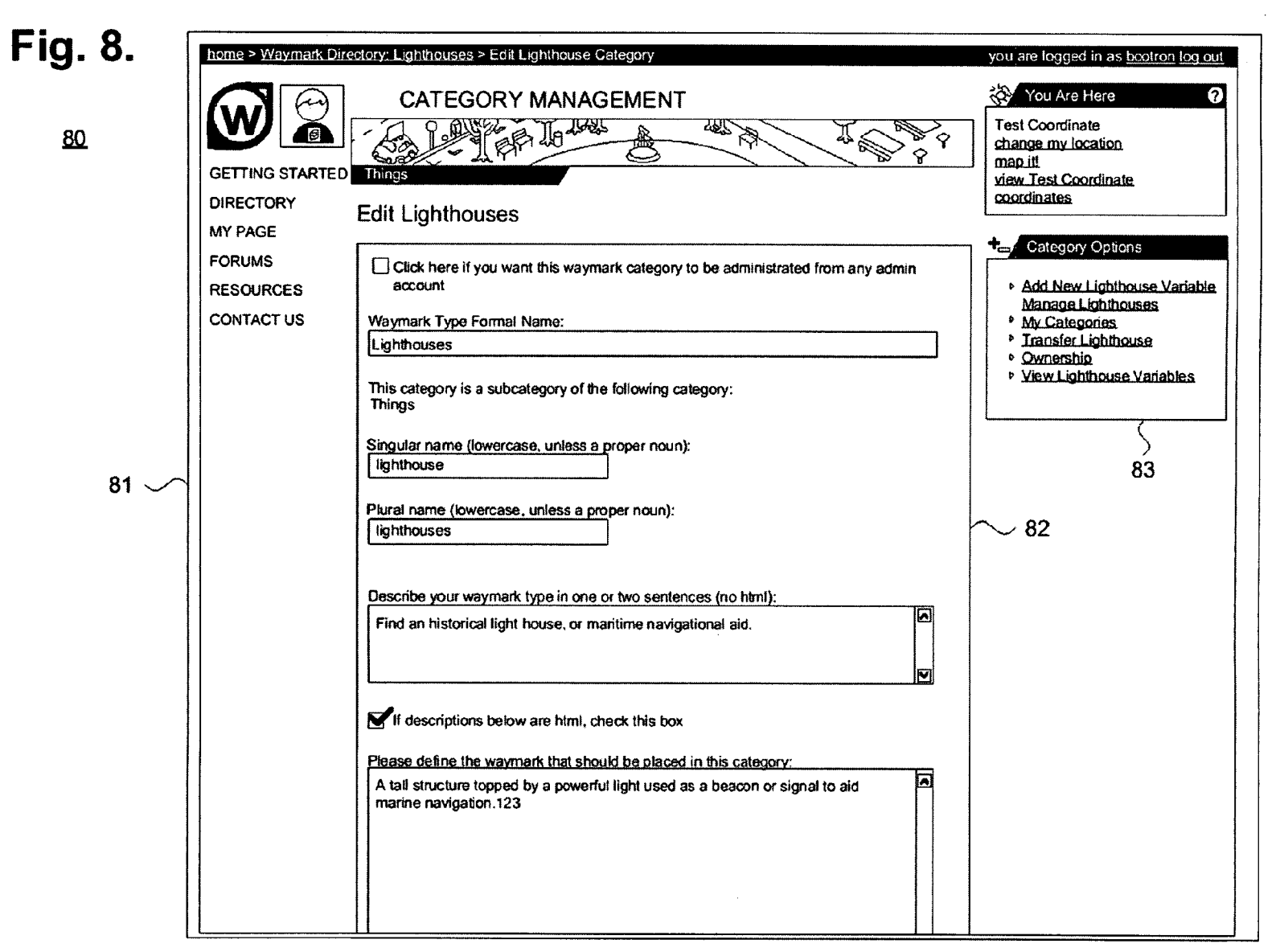

A creator 61 or owner 64 can create, manage, and control categories, as well as waymark records assigned to that category. For example, the creator 61 or owner 64 can edit his own categories. FIG. 8 is a screen shot 80 showing, by way of example, a Web page 81 for editing a category 82 of waymark records. The creator 61 can edit the category to modify the properties that are displayed to waymark record users 63. Other options 83 could be available, for instance, to add variables, manage the category, transfer ownership, and view variables.

Figure 9:
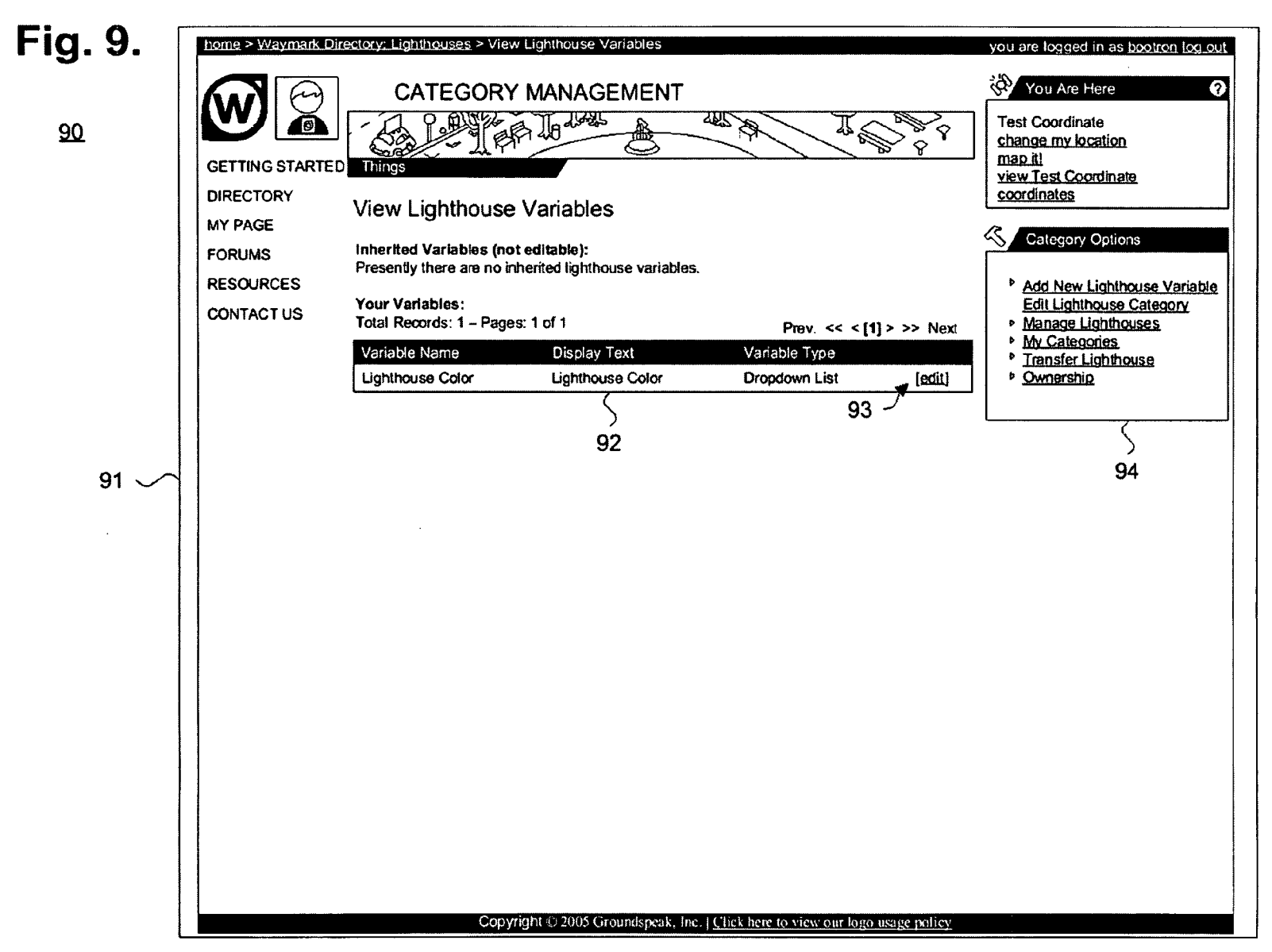

Similarly, a creator 61 or owner 64 can manage the variables currently defined for a particular category. FIG. 9 is a screen shot 90 showing, by way of example, a Web page 91 for viewing category variables 92. In one embodiment, a summary of each variable 92 is provided and includes a link 93 to Web pages for editing the attributes of the variable. Further options 94 could be available, for instance, to add new variables, edit the category, manage categories, and transfer ownership of the category.

As well, a creator 61 or owner 64 can edit the variables for each category. FIG. 10 is a screen shot 100 showing, by way of example, a Web page 101 for editing category variables 102. Depending upon the type of variable, a set of required attributes 102 and permissive set of options 103 can be provided to define the types of information that can be stored as metadata under the variable. For example, a variable for a lighthouse color could be provided as a dropdown list that includes four colors. Additional colors can also be defined and the entry of an answer by a user 63 can be specified as being mandatory or optional. Other types of variable attribute modifications and organizations are possible.

Process for Waymark Record Posting

Once a category is published online, users 63 can post waymark records 18 (shown in FIG. 1) into that category. In one embodiment, waymark records are entered through a Web site via a browser or similar user application. FIG. 11 is a process flow diagram showing a process 110 for posting waymark records to a category. A category is identified using a category, waymark record, or group search function (operation 111). Other search options are possible, such as creator, owner, or user poster options. Once identified, a user 63 can request to post a waymark record under the identified category. A database is accessed (operation 112) to retrieve variables and attributes associated with the category in response to a user request. The variables and attributes are presented to the user 63 as a display, printout, or other output (operation 113). Input metadata is received (operation 114) from the user 63 and processed for consistency (operation 115) with the variables and attributes. The input metadata can include waymarking information, such as geolocational data and waymark metadata in the form of text, images, sound, and files. Other input metadata is possible. The user 63 is notified (operation 116) when the input metadata is not consistent with the category variables and attributes. The user will then need to correct the metadata to conform the category variable and attributes. Consistent input metadata can be stored as a waymark record associated with the category (operation 117). Subsequently, a creator or owner of the category can access the waymark record for review (operation 118), as further described with reference to FIG. 12. Once the review has been completed, the waymark record can be published online (operation 119) with other waymark records associated with the category. After publication, the waymark record can be accessed via a waymark record search (operation 120), as further described with reference to FIG. 24 and, in a further embodiment, as described with reference to FIG. 26.

Users 63 can search for a particular category using a category search function. FIG. 12 is a screen shot 130 showing, by way of example, a Web page 131 for ad hoc searching of categories. A user can enter the title of a category or a keyword into the category search 132, after which the server 31 executes the search. Relevant categories 133 are displayed to the user as search results 134. For example, a user has recently visited the Alki Point Lighthouse in Seattle, Wash., and would like to post a waymark record online. In search of a matching category, the user enters the word "lighthouse" as the category search. Three subcategories, including "coastal lighthouses," "landlocked lighthouses," and "lighthouse bed and breakfasts" are returned as search results. Under each subcategory title 133, a description of the category and subcategory requirements for posting a waymark record are shown.

Continuing with the example, the user decides that the Alki Point Lighthouse is best described by the subcategory "coastal lighthouses" and selects that subcategory. FIG. 13 is a screen shot 140 showing, by way of example, a Web page 141 for submitting a request to post a new waymark record. A category box 142, located near the top of the Web page 141, includes a title and description of the category or subcategory. A waymark record box 143, located below the category box 142, provides a list of waymark records 144 that are associated with the category. Each waymark record 144 includes a title, brief description, user poster, location, date listed, and last visit. Other data can be included. A category option box 145 allows a user to post a new waymark record, view a category, or view a gallery of waymark record images by selecting an appropriate button. Returning to the example, the user confirms that the "coastal lighthouses" subcategory is appropriate for posting a waymark record for the Alki Point Lighthouse. The user selects the post new waymark record button under the category options box 145 and is transferred to a series of Web pages for guided assistance in adding the Alki Point Lighthouse as a waymark record.

FIG. 14 is a screen shot 150 showing, by way of example, a Web page 151 for entering input metadata for a new waymark record. A set of data entry tabs 152, including an "enter information" tab, an "upload image" tab, and a "preview and submit" tab, allow a user to navigate between multiple Web pages during waymark record posting. Other tabs or navigation aids are possible. Instructions or rules 153 for posting a waymark record are displayed to ensure that the waymark record is being posted under the appropriate category. Variables, including name 154, description 158, and spatial data variables, such as coordinates 155, country 156, and state 157, are displayed on the Web page to guide the user in providing correct input metadata for the waymark record. Attributes can also be displayed on the Web page to further guide the user in providing input metadata. A data entry box is located near each variable for entering input metadata associated with that variable. The data entry box can be formatted or unformatted. Formatted data entry boxes can include a drop down menu, check boxes, fillable circles, or browse buttons to upload stored metadata, whereas, unformatted data entry boxes provide an empty designated box for entering text. Each formatted data entry box includes attributes further describing the variable. Other types of data entry boxes and variables are possible.

The user can enter input metadata for a particular waymark record, such as the Alki Point Lighthouse, in each of the data entry boxes. The input metadata, including text, images, and sound can be entered directly by the user or uploaded as a file. After providing the requested metadata (and reading the terms of use agreement), the user can select a "save and continue" button 159. Once selected, the input metadata is processed by the server 31 to determine whether the entered information is consistent with the displayed variables and attributes. If the input metadata is consistent, the waymark record posting process continues. However, if the input metadata is not consistent, the user is notified.

FIG. 15 is a screen shot 160 showing, by way of example, a Web page 161 for providing a notification to a user. A user can receive a notification if he enters input metadata that is inconsistent with the variables and attributes displayed on the enter metadata Web page 151 or if the entered input metadata, such as the geolocational data matches the metadata for another waymark record previously entered. The notification can be displayed as a separate Web page, popup display, or other display. Each notification can include an inconsistent data box 162 containing a reason for the notification display, such as an existing waymark record that is the same as the waymark record being entered, metadata required to be entered, or metadata that is entered incorrectly. Other reasons are possible. Tips for correcting the inconsistency are also provided, when appropriate. Existing waymark records that may conflict with the waymark record being added by the user can be provided below the inconsistent data box 162. Once the inconsistent data, tips, and conflicting waymark records have been reviewed, the user can choose to save the waymark record or return to the edit page by selecting the appropriate button 164. Other types of notification, data, and user buttons are possible.

Referring back to the previous example, the user entered the coordinates for the Alki Point Lighthouse. After selecting the "save and continue" button 159, the user is notified by an alert Web page 161 that a portion of the input metadata entered is not consistent with the category rules or predetermined variables and attributes. As displayed on the alert Web page 161, other waymark records located within a half mile of the coordinates entered for the Alki Point Lighthouse, or other distance or bound, are identified. If one of the identified waymark records is the same as the Alki Point Lighthouse, the input metadata for Alki Point Lighthouse waymark record is not new and should be logged as a visit The tip suggests that the user can log the Alki Point Lighthouse under already-identified waymark records, such as further described below with reference to FIGS. 18-19.

Figure 16:
FIG. 16 is a screen shot showing, by way of example, a Web page for uploading an image for a waymark record.

If the user determines that the existing waymark record is not the same as the Alki Point Lighthouse and the input metadata entered is consistent with the category rules, variables, and attributes, the waymark record posting process can continue. FIG. 16 is a screen shot 170 showing, by way of example, a Web page 171 for uploading an image for a waymark record. The image can include a physical object associated with the geolocational data of the waymark record to be entered. Variables, such as the file 172, file caption 173, and file description 174, are displayed to a user. Other variables are possible. Similar to the enter metadata page 151, the user can enter input metadata corresponding to the variables. Once complete, the user can select an "upload image" button 175 to navigate to the next tab or control. Uploading an image for inclusion with a waymark record can be required or optional, as determined by the creator of the category or another authorized individual.

Figure 17:
FIG. 17 is a screen shot showing, by way of example, a Web page for previewing and submitting a waymark record.

FIG. 17 is a screen shot 180 showing, by way of example, a Web page 181 for previewing and submitting a waymark record. The input metadata entered in compliance with the rules, variables, and attributes is displayed for review by the user in a review box 182, which can include a category section 183, instruction section 184, search section 185, and recent visit section 186. The category section 183 lists the category and subcategory, if applicable, for the waymark record. The instruction section 184 informs users of the requirements for entering a log for the waymark record. The search section 185 provides links to additional Web pages for information associated with the waymark record. The recent visit section 186 displays logs for the waymark record posted by other users. After review of the entered metadata, the user can select a "submit waymark record" button 187 or a "save and submit later" button 188.

Figure 23:
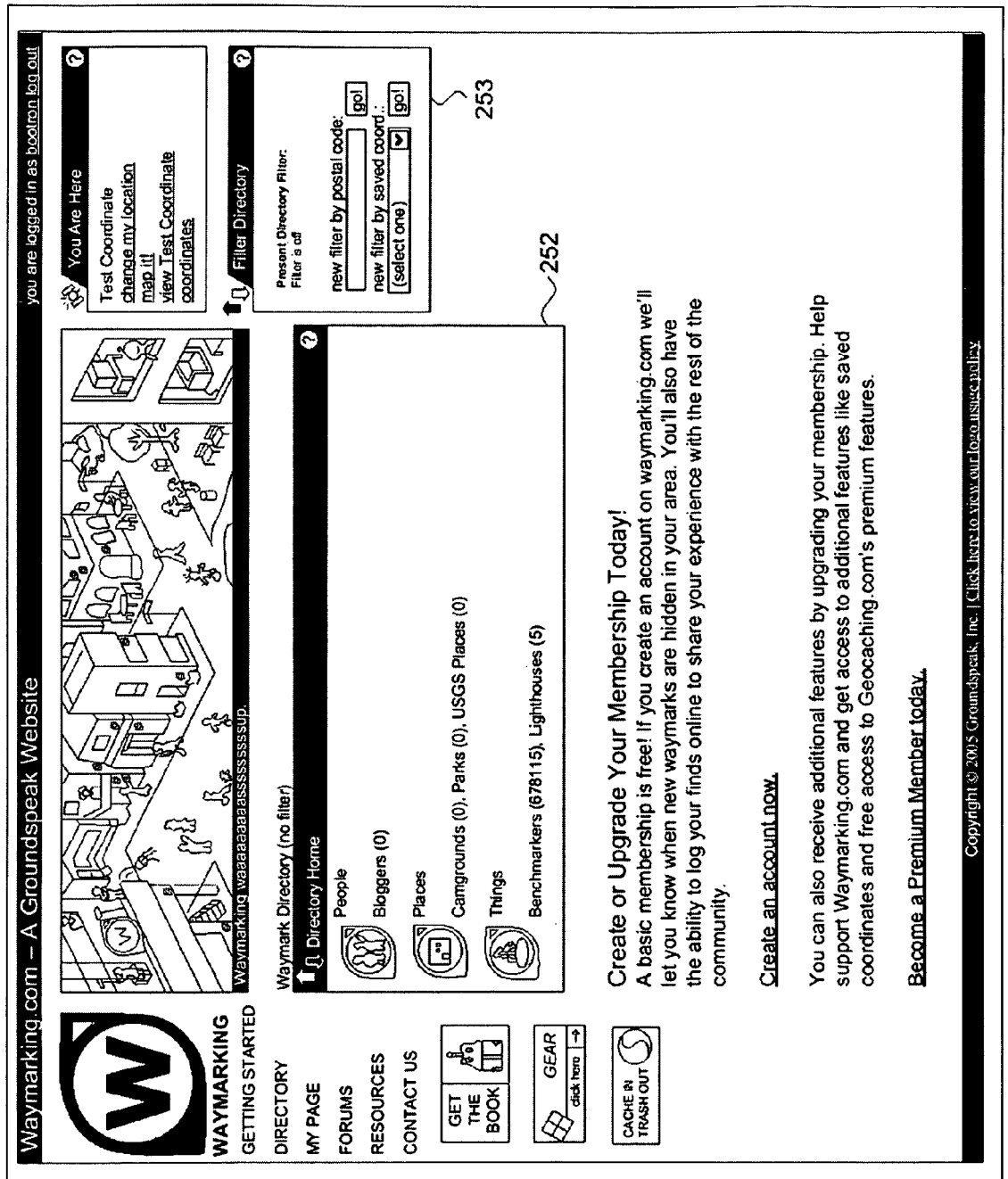
FIG. 23 is a screen shot showing, by way of example, a Web page for navigating a set of directories of waymark records.

Once submitted, the waymark record can be accessed by a creator or owner for review, as described with reference to FIGS. 23-25. Upon acceptance by the creator or owner, the waymark record can be published online for display with other published waymark records associated with the category or subcategory. The published waymark records can thereafter be located via user searches, such as a category search, waymark record search, group search, or saved waymark record search.

Users 63 can view a particular waymark record 44 and submit commentary via a log. FIG. 18 is a screen shot 190 showing, by way of example, a Web page 191 for a published waymark record with a post log button 192. A title 193 of the waymark record is located near the top of the Web page 191. Below the title 193, a waymark record facts box 194 is displayed, which can include the category or subcategory to which the waymark record belongs, a user poster identification, geolocational data, quick description, posting data, waymark record code, views, and one or more pictures. Other waymark record data is possible. A description section 195 of the published Web page 191 is located below the facts box 194 and displays a detailed description of the waymark record. An instruction section 196 provides log instructions for other users. Other information boxes and data are possible.

User options for waymark records, discussions, and searches can be located on the right side of the waymark record Web page 191. An option box 197 includes a visit waymark record (post log) button 192, view visits button 198, view waymark record button 199, and view gallery button 200. The visit waymark record (post log) button 192 allows a user to post a log under a particular waymark record, if the user has visited that waymark record or wants to provide information about the waymark record. Once the visit waymark record (post log) button 192 is selected, the user is transferred to a post log Web page (not shown), which displays a template to guide the user in providing information. A discussion box 201 on the published Web page 191 provides related topics and forums for user participation. A search box 202 provides different search options for users, including waymark record, category, visit, and group searches. Other option boxes and associated options are possible.

The log entries for a waymark record can be organized by user, waymark record, or category groupings and presented in a directory or list. FIG. 19 is a screen shot 210 showing, by way of example, a Web page 211 for a set of log entries 142 regarding waymark records. The log entries 212 are presented in a list format and can include information, such as narrative text, rating, date logged, further metadata, and other information. The category associated with each log entry can be stored and displayed with the list of log entries. However, other methods of storing and displaying the categories, waymark records, and log entries are possible. Log entries can be edited by the author of the entry, or the creator or owner of the category, and viewed by other users.

Reviewing and Editing Waymark Records

Figure 20:
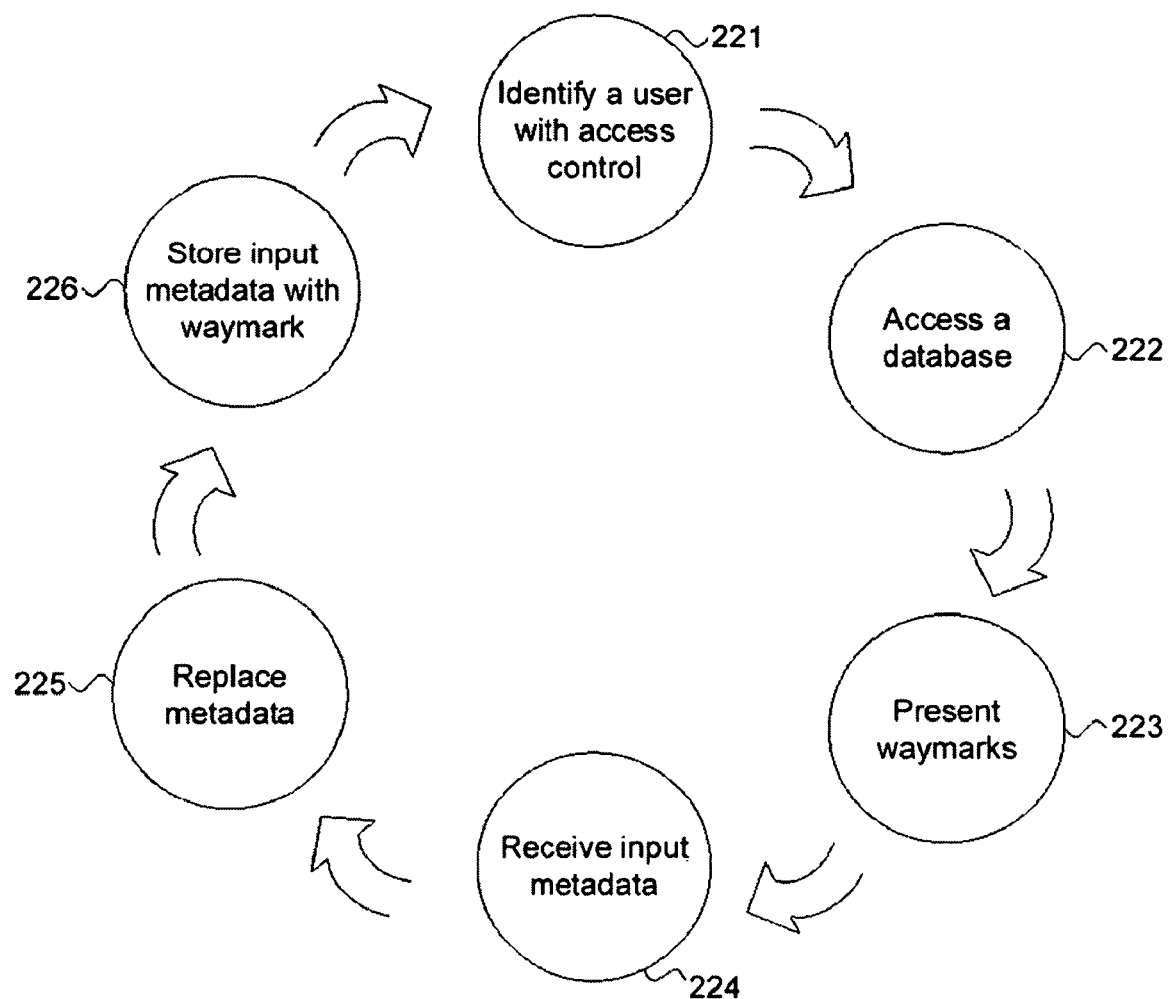
FIG. 20 is a process flow diagram showing a process for managing waymark records in a category.

A creator 61 or owner 64 can manage and edit the waymark records and associated logs posted under a particular category or subcategory. FIG. 20 is a process flow diagram 220 showing a process for managing waymark records in a category. Each category, including category rules, variables, attributes, and waymark records, are stored in a database 32 (shown in FIG. 3) with associated waymark records 33. The creator or owner of a category can provide a creator or owner identifier, such as a password or identification number to identify himself as having access to and control of the category (operation 221). Once identified, the database 32 of categories and waymark records can be accessed (operation 222). The creator or owner can search for the category using a search function or a directory, as well as other access methods. The waymark records associated with the category are presented to the creator or owner (operation 223). The creator or owner can chose to review and edit each presented waymark record by providing input metadata to correct, replace, or add to the existing metadata stored for that waymark record. The input metadata is received (operation 224) and can replace at least a portion of the existing metadata (operation 225). The input metadata can also be added to the existing metadata without replacement of the existing metadata. The input metadata from the creator or owner is stored with the waymark record in the database 32 (operation 226).

Waymark records can be edited before or after the waymark record is posted for display. FIG. 21 is a screen shot 230 showing, by way of example, a Web page 231 for editing a waymark record. An instruction box 232 is located near the top of the Web page 231. The instruction box 232 can include rules that a user must satisfy for creating a waymark record in the category, as well as rules that describe waymark records not allowed. Input metadata, such as waymark record text entered by a user, is displayed in a data entry box 233. A creator or owner of the category can edit the text by deleting, replacing, or changing existing input metadata for the waymark record. Additionally, the user who created the waymark record can edit the saved record prior to submission for publication. Additional input metadata can also be added to the existing metadata. The additional and edited input metadata can be saved by selecting an "update waymark record" button 234.

Figure 22:
FIG. 22 is a screen shot showing, by way of example, a Web page for editing log postings.

The creator or owner can also review and edit logs posted by users under a waymark record in a particular category or subcategory. FIG. 22 is a screen shot 240 showing, by way of example, a Web page 241 for editing log postings. Log instructions 242 are located near the top of the Web page 241. A title of the waymark 243 to which the log visit belongs, appears below the instructions 242. Text entered by a user for the log is displayed in text boxes 244, including drop-down boxes, text only boxes, and check boxes. Text boxes 244 can be used for log information, such as type of log, date recorded, additional geolocational data, and comments. Other log information is possible. The creator or owner can edit the log data by changing the information provided by the user in the text boxes 244. The creator or owner can also edit the log data by deleting or changing existing log data, as well as adding new log data. The changes made by the creator or owner can be saved by selecting an "update log" button 245.

Accessing Waymark Records

A standardized Web-based user interface allows online clients 35, 36, 37, 38 that are executing Web browsers to manage, navigate, and search the stored waymark records. FIG. 23 is a screen shot 250 showing, by way of example, a Web page 251 for navigating a set of directories of waymark records 44. To facilitate navigation in an outline format, the set of directories 252 are presented as links to Web pages of individual categories. In addition, the set of directories presented can be refined by applying a filter 253 to limit scope.

Figure 24:
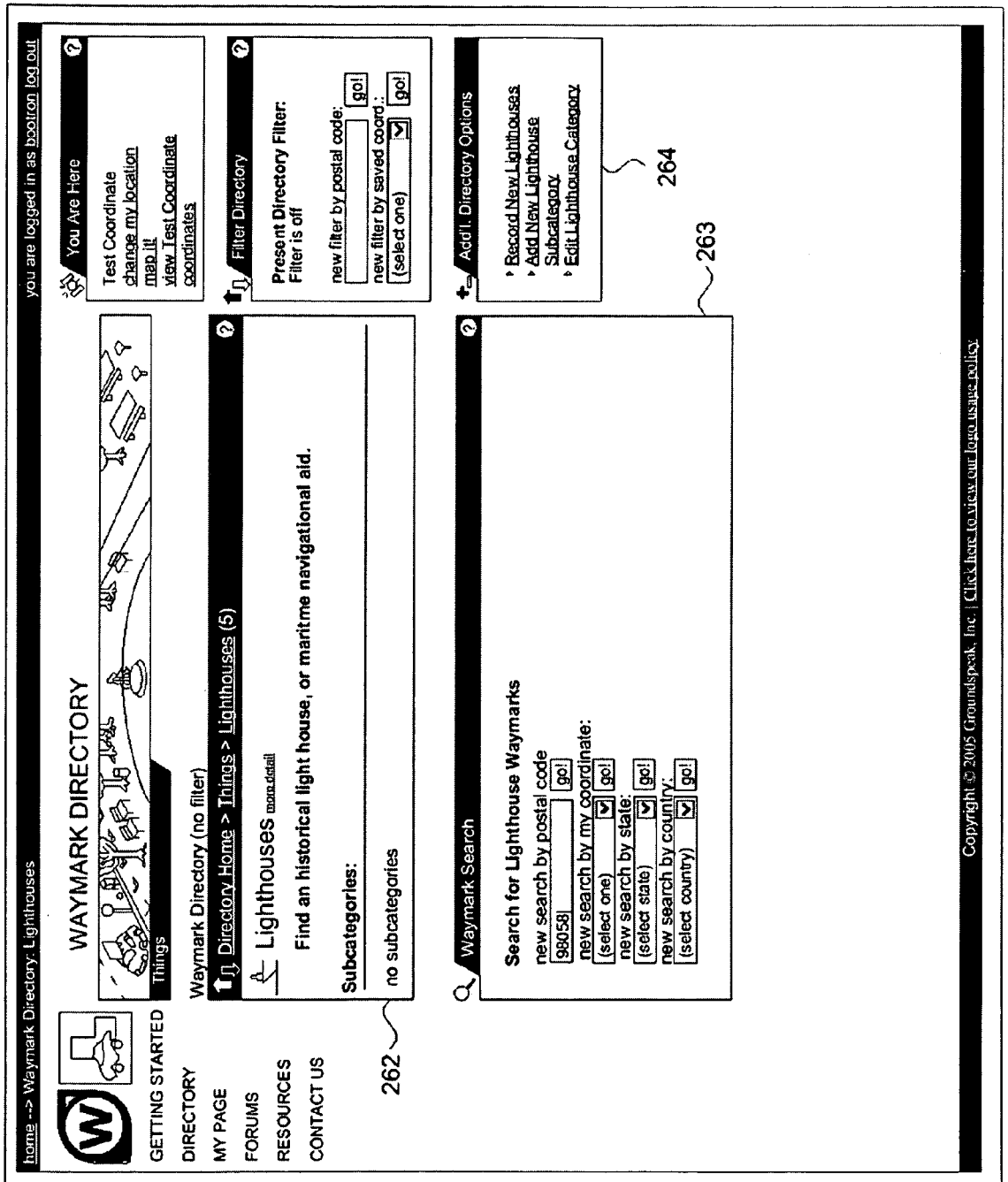
FIG. 24 is a screen shot showing, by way of example, a Web page for ad hoc searching of waymark records.

FIG. 24 is a screen shot 260 showing, by way of example, a Web page 261 for ad hoc searching of waymark records 262. A capsule summary 262 of the category or subcategory selection is displayed, which can include a set of links for any subcategories. In one embodiment, waymark records 44 can be searched directly through a search panel 263 that accepts geolocations, such as postal code, state, or country, as well as by map or geolocational coordinates. In a further embodiment, the ability to search for metadata within variables can also be included by color or other metadata variable. Additional options 264 could be available, for instance, to record a new waymark record under the category, add a new category, or edit an existing category.

Searching via the search panel 263 generates a set of search results. FIG. 25 is a screen shot 270 showing, by way of example, a Web page 271 for viewing search results 272. By default, the search results 272 are presented in a list format that provides a brief synopsis of each waymark record and a link to access the waymark record, including any metadata. Additional options 273 could be available, for instance, to record a new category or subcategory, add a new category or subcategory, or edit an existing category or subcategory.

Mapping Waymark Records

Once accessed through a search function, a user can map one or more waymark records for display in a geobrowser, which includes two- and three-dimensional Earth browsers, such as Google Earth or Maps and Mobile. However, other types of geobrowsers are possible. The geobrowser can be an application that is downloaded onto a user's computer for local execution. Generally, geobrowsers are compatible with geospatial language scripts, such as the Geography Markup Language (GML) and KML. Other geospatial languages and scripts are possible.

More particularly, GML is an XML grammar that can be used to express geographical features, which are described by properties, including simple properties and geometric properties, such as points, polygons, and linestrings. The geometric properties define a location of a feature and are maintained separately from the geographical features. The geographical features include a physical entity, such as a person, place, or thing. Each geographical feature can be associated with one or more geometric properties. GML is complementary to KML, which is an XML-based language schema for visualizing geographic information on Web-based maps. A set of features is determined for display in the geobrowser. The features can include placemarks, images, polygons, three-dimensional models, and textual descriptions. KML uses geolocational coordinates, such as latitude and longitude measures, to reference the features. Other types of features are possible.

Using the geobrowser and the geospatial language script, the user can display one or more waymark records on a map by downloading the waymark record. FIG. 26 is a screen shot 280 showing, by way of example, a Web page 281 for downloading a waymark record. A title 282 of the waymark record is located near the top of the Web page 281. A waymark record fact box 283 is located below the title 282 and can include a category in which the waymark record belongs, a user poster identification, geospatial data, a short description, posting data, a waymark record code, and a number of views. The waymark record fact box 283 can also include links to download the waymark record as a geospatial data file 284, such as a GML file (suffixed ".LOC") or a KML file (suffixed ".KML"). Other types of geospatial data files and information for display in the waymark record fact box are possible.

A user can select to download the waymark record using one or more of the geospatial data file links 284. Once selected, the waymark record is stored locally on the user's computer as a data file specified by the selected link. The user can display the stored waymark record by opening a geobrowser application, such as Google Maps. Once open, the user can locate and open the stored waymark record in the data file via the geobrowser, which automatically maps the location associated with the waymark record. The waymark record is displayed on a map from the geobrowser using an icon, such as a colored circle, camera, or category identifier, or by an image or sound. Other types of displays or indications for the waymark record are possible. Additionally, the waymark record can be displayed alone or with other waymark records, including waymark records located within a certain distance, belonging to a same category, entered by a same creator or user, or based on the user's interest. Other types of waymark records can be displayed.

In a further embodiment, a discussion forum or Web log ("Blog") relating to a certain location that is identified by geolocational or other data can be provided. The location can be specified free form, that is, the location need not be nearby or containing a waymark record, nor, in a further embodiment, be within a zone of influence. For example, a user could start a location-based discussion regarding an object on, around, or near a popular landmark, such as a park. Other users wanting to find discussions close to their own location, or any other location, can search for topics based on that location to find related discussions, including filtering log entries 142 by location and waymark record category, as well as other parameters, and by using other types of searches. Thus, another user at a university nearby a park, for instance, who is searching for topics relating to locations around the university might also find the discussion regarding the park, in addition to other discussions relating to locations that are within their specified search radius.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing a guided user interface to process waymark records, comprising:
    a database to maintain categories of published waymark records, wherein each category is associated with at least one variable and one or more attributes, which each specify a type of metadata for the variables;
    a display to present the variables and attributes for one of the categories in response to a request from a user; and
    a processor to apply a user interface to process input metadata for a physical object by receiving the input metadata comprising coordinates for the physical object from the user, by determining a consistency of the input metadata with the variables and attributes associated with the category, by providing notice to the user when the coordinates of the physical object are within a particular distance of one of the published waymark records, by compiling the input metadata as a waymark record for the physical object when the physical object is not the same as the published waymark record, and by logging a visit to the physical location by the user on the published waymark record when the physical object is the same as the published waymark record,
    wherein the waymark record is published and displayed on a map.

2. A system according to claim 1, wherein the input metadata includes at least one of text, images, and sound.

3. A system according to claim 1, wherein at least one of the variables for each published waymark record comprises a spatial data variable and the input metadata for the spatial data variable comprises geolocational data defining a location of the physical object associated with that published waymark record.

4. A system according to claim 3, further comprising:
    a search module to enable searching of the database for one or more published waymark records based on the geolocational data.

5. A system according to claim 1, comprising:
    a submission module to submit the waymark record for review by an authorized user prior to publication.

6. A system according to claim 1, further comprising:
    an access module to access one of the published waymark records from the database upon a request from another user;
    the display further to display the accessed waymark record;
    a log module to log additional metadata from the other user that is associated with the input metadata; and
    the database to store the additional metadata with the accessed waymark record.

7. A system according to claim 1, further comprising:
    a notification module to notify the user when the input metadata is not consistent with the variables and attributes for that category.

8. A system according to claim 1, further comprising:
    a geospatial module to download at least one of the published waymark records as a geospatial data file, wherein the published waymark record is displayed on a map.

9. A system according to claim 1, further comprising:
    a logging module to log visits by other users under at least one of the published waymarks.

10. A system according to claim 1, wherein the consistency is determined based on at least one of the input metadata complies with the variables and attributes for the category and the input metadata does not match metadata for a different waymark record.

11. A method for providing a guided user interface to process waymark records, comprising:
    maintaining categories of published waymark records, wherein each category is associated with at least one variable and one or more attributes, which each specify a type of metadata for the variables;
    presenting the variables and attributes for one of the categories in response to a request from a user; and
    applying a user interface to process input metadata for a physical object, comprising:
        receiving the input metadata comprising coordinates for the physical object from the user;
        determining a consistency of the input metadata with the variables and attributes associated with the category;
        providing notice to the user when the coordinates of the physical object are within a particular distance of one of the published waymark records;
        compiling the input metadata that is consistent as a waymark record for the physical object when the physical object is not the same as the published waymark record; and
        logging a visit to the physical location by the user on the published waymark record when the physical object is the same as the published waymark record,
    wherein the waymark record is published and displayed on a map.

12. A method according to claim 11, wherein the input metadata includes at least one of text, images, and sound.

13. A method according to claim 11, wherein the at least one of the variables for each published waymark record comprises a spatial data variable and the input metadata for the spatial data variable comprises geolocational data defining a location of the physical object associated with the waymark record.

14. A method according to claim 13, further comprising:
    enabling searching of the database for at least one published waymark record based on the geolocational data.

15. A method according to claim 11, comprising:
submitting the waymark record for review by an authorized user prior to publication.

16. A method according to claim 11, further comprising:
accessing one of the published waymark records from the database upon a request from another user;
displaying the accessed waymark record;
logging additional metadata from the other user that is associated with the input metadata; and
storing the additional metadata with the accessed waymark record.

17. A method according to claim 11, further comprising:
notifying the user when the input metadata is not consistent with the variables and attributes for that category.

18. A method according to claim 11, further comprising:
downloading at least one of the published waymark records as a geospatial data file; and
displaying the published waymark record on a map.

19. A method according to claim 11, further comprising:
logging visits by other users under at least one of the published waymarks.

20. A method according to claim 11, wherein the consistency is determined based on at least one of the input metadata complies with the variables and attributes for the category and the input metadata does not match metadata for a different waymark record.

* * * * *